Oct. 30, 1934.  W. A. MORTON  1,978,645
APPARATUS FOR FEEDING MOLTEN GLASS TO SUCTION CUPS
Filed Dec. 9, 1929
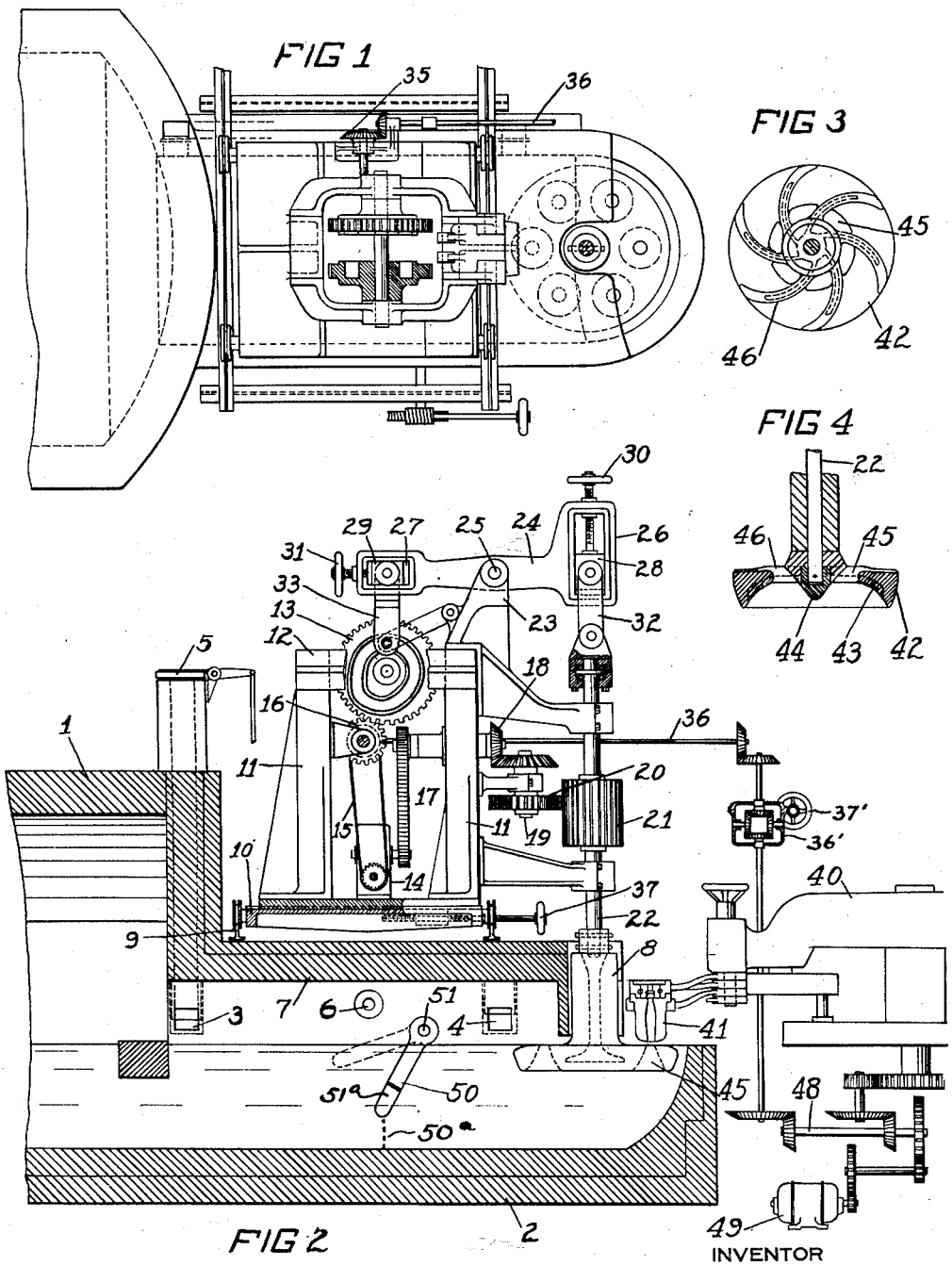
INVENTOR
William A. Morton
by William B. Jaspert
Attorney.

Patented Oct. 30, 1934

1,978,645

UNITED STATES PATENT OFFICE 1,978,645

APPARATUS FOR FEEDING MOLTEN GLASS TO SUCTION CUPS

William A. Morton, Pittsburgh, Pa., assignor to Amco, Incorporated, Pittsburgh, Pa., a corporation of Pennsylvania Application December 9, 1929, Serial No. 412,907

6 Claims. (Cl. 49—56)

This invention relates to apparatus for feeding molten glass to ware forming machines, and it is among the objects thereof to provide a feeder which shall be of simple and durable mechanical construction and which shall be positive and efficient in its operation for providing a clean, unchilled surface of glass to the successive molds of a ware-forming machine.

In the prevailing methods of delivering molten glass charges to ware forming machines of the suction type, the parison molds, or the molds receiving the charge of glass, were dipped into a stationary or rotatable forehearth or feeder having a pool of glass with a fixed level. In these prior art devices it was not always possible to dispose of the chilled glass which was sheared off the parison mold or which had been in contact with the metal mold parts, and although attempts have been made to produce circulation of the glass pool in the region of its contact with the parison mold to present glass of the proper quality for each successive dip of the molds, these attempts have not always been successful.

In accordance with the present invention the glass is not only displaced at its surface between the successive contacts of the mold, but in addition, a mass sufficient for the successive charges of the mold is constantly brought up to the charging surface from the sub-surface of the glass pool, and also above the level of pool from which the supply is obtained.

In accordance with the present invention, a delivery device in the form of a ladle is adapted to reciprocate vertically to raise a quantity of molten glass for engagement with the parison mold which is in alinement with and suspended over the ladle in a manner to provide a glass supply intermittent to a ware-forming machine. Provision is made to rotate the ladle to continuously displace the glass in the region of the mold charging opening.

By this method, the glass delivered by the reciprocating ladle is constantly renewed by heated material from below the surface of the pool and the glass chilled by contact with the parison molds is eliminated as an impediment to the delivery of workable metal to the mold.

The delivery device may be circular in the form of an inverted cup which is provided with one or more openings or perforations through which the molten glass is forced upwardly to the upper portion of the device when the latter is subjected to a down stroke, and spiral ribs are provided to confine the portion so delivered to a space in which the parison mold is operated. The partition members, on account of the rotary movement of the ladle, function as impeller members to throw off the chill which may accumulate at the top of the delivery device, thus further assuring that a clean fresh batch of glass is available at all times for the successive charges of the parison mold.

These specific features of the feeder will become more apparent from a consideration of the accompanying drawing which constitutes a part hereof and in which Fig. 1 is a plan view, partially in section, illustrating an embodiment of this invention; Fig. 2 a longitudinal sectional view partially in elevation, showing the cooperation of the delivery device with the forehearth or tank of a glass melting furnace; and Figs. 3 and 4 top plan and cross sectional views, respectively, of the delivery device.

With reference to Fig. 2 of the drawing, the structure therein illustrated comprises a melting tank generally designated at 1, having a forehearth or feeder 2 in which the glass is constantly delivered from the tank to maintain a fixed level of glass therein. Features of the forehearth are a plurality of flues 3 and 4, connected to separate dampers, one of which is shown at 5 for controlling the flue 3. A burner 6 is provided and the flues 3 and 4 may be controlled to draw the heat either to the forward end or the rear end of the forehearth as desired.

The forehearth is provided with a cover member 7 which is open at its extreme forward end as shown in Fig. 1, exposing a minimum portion of the glass pool to the atmosphere, this portion corresponding in surface area to substantially one-third the area of the delivery device and the chilling effect of the atmosphere is further negatived by the position of the delivery element which is generally designated at 8 in Fig. 2 of the drawing.

The cover member 7 of the forehearth constitutes a support for a track 9 which may extend over a number of forehearths of different furnaces to render the delivery mechanism portable from one furnace to another as they are put into use. The tanks 9 support a wheeled carriage 10 which carries a pair of pedestals 11 having a yoke element 12 in which are mounted a gear and cam mechanism 13. A gear reduction unit 14 is mounted on the bottom of the carriage 10 and is connected by a sprocket chain 15 to a pinion member 16 which is in toothed engagement with the gear and cam element 13 to actuate the latter. The gear reduction unit 14 is connected through gear wheels 17 with a shaft 18 having geared connections to a shaft 19 which in turn carries gear wheels 20, the teeth of which interact with the teeth of gear wheel 21 that is carried on a vertical spindle 22 of the delivery device 8. One of the pedestal members 11 has an upwardly projecting portion 23 which carries a rocker arm 24 that is provided with slotted openings 26 and 27 which constitute guides for adjusting blocks 28 and 29 that are adjusted through screw and nut mechanisms generally designated at 30 and 31. The block 28 is connected by a link 32 to the shaft 22 of the delivery device and the block 29 is connected by a link 33 to a cam follower which cooperates with the cam mechanism 13 to subject the rocker arm 24 to oscillating motion, thereby subjecting the shaft 22 of the delivery device to vertical reciprocatory movement.

As shown in Fig. 1 the gear reduction unit 14 is connected by gearing 35 to a drive shaft 36 which is connected through a differential 36' with the drive mechanism of the ware forming machine, a portion of which is shown at 40 whereby the operation of the feeding mechanism is synchronized with the operation of the ware forming or blowing machine. A screw and nut mechanism having a hand wheel 37 is provided to adjust the horizontal position of the entire feeder device whereby the position of the delivery element 8 may be adjusted with respect to a parison mold 41, Fig. 2, which is a portion of the ware forming machine partially shown at 41.

With reference to Figs. 3 and 4 of the drawing, the delivery device consists of a circular member 42 of refractory material having its bottom portion cut away as at 43 and having a central element 44 which is complementary to the cup portion of the delivery device and cooperates therewith to confine the glass beneath the delivery element and aid in its displacement through perforations or openings 45 when the delivery device is subjected to downward movement into the glass pool.

As shown in Fig. 3 a spider comprising a plurality of spiral arms 46 is formed integrally with the delivery device and projects slightly above the main body portion of the device, as shown in Fig. 4 of the drawing for the purpose of constituting the upper portion thereof a plurality of separate shallow compartments.

As shown in Fig. 2, the drive shaft 36 of the feeder is operatively connected to the drive mechanism 48 of the suction forming machine 40 which is driven by a motor 49. In this manner the vertical and rotary movements of the delivery device are synchronized or timed with the operating movements of the forming machine to deliver glass to the successive molds as they are brought in alinement with the delivery member.

A baffle member 50 of refractory material extends across the working tank and is hinged at 51 to provide for angular adjustment whereby the depth of glass flow is regulated.

By varying the angular movement of the member 50 the distance designated by the dotted line 50a may be varied to vary the depth of glass flow. Thus when the baffle 50 is in a vertical position, the depth of flow will be a minimum and the low temperature glass will move toward the feeding mechanism.

The employment of such flow regulating means is beneficial in providing glass of high viscosity for the heavier grades of glassware and also to prevent the glass becoming stagnant by remaining stationary adjacent the wall of the feeder at temperatures that cause devitrification.

To further prevent the glass becoming stagnant in the pool, in the lower temperature region adjacent the bottom of the working tank, the sides of the baffle may be cut away at the ends thereof at 51a thus permitting glass flow not only at the bottom but also at the lower portion of the side walls.

The operation of the glass feeder is briefly as follows:

The feeder and ware forming machine are arranged in proper alinement with the parison molds 4 in alinement with the openings 45 of the feeder, and the parison molds in the ware forming operation are indexed successively to the position of alinement with the delivery device 42 of the feeder.

Through the drive mechanism of the ware forming machine the shaft 36 becomes actuated and in turn actuates the cam mechanism 13 and the spindle 22 of the delivery device whereby through the rocker arm 24 the delivery device is subjected to reciprocatory movement in a vertical direction.

Through the reciprocating movements of the delivery device, the glass is forced upwardly through the openings 45 into the shallow compartments constituted by the angularly spaced ribs 46 and is brought into contact with the suction molds which are evacuated, whereby the fresh glass at the top of the delivery device is drawn into the mold. The surface of glass thus fed to the molds may be raised above the surface of the pool and the surface of the pool itself may be raised or lowered by regulating the feed of glass from the melting tank to the working tank. Upon the next successive stroke of the delivery device the latter will be rotated to a new position wherein another one of the shallow compartments formed between the ribs 46 is brought into alinement with the charge receiving position of the parison mold. In its downward movement the delivery device displaces the subsurface glass through the opening to the shallow compartment and by the viscosity of the glass it is held there for a sufficient length of time to charge the mold when the delivery mechanism operates to raise the glass against the bottom face of the mold.

By the continuous operation of the delivery device any chilled glass will be removed from the charging portion of the forehearth and delivered to the rear portion thereof where it is reconditioned by the heat of the melting furnace or the burner 6 through proper regulation of the flues 3 and 4.

By adjusting the length of its stroke the delivery device may be made to submerge deeper in the glass pool whereby the cooler glass from the bottom of the tank may be raised and fed to the parison molds 41.

Since the cooler glass is of greater viscosity than the hot glass it collects at the bottom of the pool and as it is desirable to utilize the cooler glass for some ware forming operations, provision is made by the adjustment of the baffle 50 to have the glass withdrawn at the feeding end varied in temperature by adjusting the depth of flow underneath the baffle. Hence the cooler glass will flow along the bottom of the working tank to the region of the delivery device.

It will be seen that by the form of delivery device employed in the feeder herein described, a minimum amount of glass surface is exposed to the atmosphere and a fresh clean mass of glass is positively fed to the charging position of the parison molds 41 for each successive charge of glass to the molds.

By operating the differential 36' through the rotation of hand wheel 37' the delivery device may be angularly adjusted with respect to the parison molds 41. Such adjustment may be made without interrupting the operation of the delivery device and ware forming machine, and is beneficial in that it further provides against feeding stagnant glass to the molds.

I claim:

1. In a device for delivering molten glass to a suction forming machine the combination with a forehearth having a glass pool at a fixed level, of a plurality of parison molds adapted to extend over said pool, a delivery device submerged in the pool, means for subjecting the delivery device to vertical movement to raise a portion of the glass in contact with the mold and means cooperating with said first named means for rotating said delivery member to displace the glass intermittently in accordance with the movement of the successive molds.

2. In a device for delivering molten glass to a ware forming machine of the suction type, means for reciprocating said device vertically to receive glass during a downward stroke, means to support the glass and deliver it during an upward stroke and means causing the glass to flow on said support by rotating said device.

3. In a device for delivering molten glass to a forming machine of the suction type, the combination of a molten glass container, a perforate member associated with the glass in said container, means to reciprocate said member to receive a supply of glass thru said perforations, means to rotate said member and spiral impellers on said member moving the glass from the axis of rotation.

4. In a device for delivering molten glass to a forming machine of the suction type, the combination of a molten glass container, a perforate cup-shaped member, having a spiral portion, means for reciprocating said member to force a supply of glass through said perforations, and means for rotating said member to cause the glass to flow away from said perforations.

5. In a device for delivering molten glass to a suction forming machine, the combination with a working tank for delivering glass at a uniform rate, of a suction mold, a delivery device for raising molten glass to said mold, and means for regulating the angular position of said delivery device with respect to its mold engaging portion.

6. In a device for delivering molten glass to a ware forming machine of the suction type, a perforated rotator adapted for vertical and horizontal movement, means for reciprocating said device vertically to extrude glass through the perforations during a downward stroke, means to support the glass and deliver it during an upward stroke and means causing the glass to flow on said support by rotating said device.

WILLIAM A. MORTON.